United States Patent
Alexander et al.

(10) Patent No.: US 7,228,252 B2
(45) Date of Patent: Jun. 5, 2007

(54) INCREASED PRECISION POSITION SENSORS

(75) Inventors: Richard J. R. Alexander, Horfield (GB); Richard W Manley, Redditch (GB); Carol Ann Walker, Oyster Bay (AU)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 10/523,396

(22) PCT Filed: Nov. 4, 2004

(86) PCT No.: PCT/GB2004/004674

§ 371 (c)(1),
(2), (4) Date: Apr. 5, 2005

(87) PCT Pub. No.: WO2005/047823

PCT Pub. Date: May 26, 2005

(65) Prior Publication Data

US 2006/0041398 A1    Feb. 23, 2006

(30) Foreign Application Priority Data

Nov. 7, 2003  (EP) .................................. 03257035
Nov. 7, 2003  (GB) .................................. 0325989.2

(51) Int. Cl.
  *G01C 9/00*  (2006.01)
  *G01C 17/00*  (2006.01)
(52) U.S. Cl. .................................... 702/150
(58) Field of Classification Search ............... 702/150; 324/207.17
See application file for complete search history.

(56) References Cited

U.S. PATENT DOCUMENTS

| 5,434,500 | A  |   | 7/1995  | Hauck et al. |
| 6,292,758 | B1 | * | 9/2001  | Gilbert et al. ............... 702/150 |
| 2002/0008513 | A1 | * | 1/2002 | Hiligsmann et al. ........ 324/251 |
| 2002/0050043 | A1 |   | 5/2002 | Sarh et al. |
| 2003/0184285 | A1 | * | 10/2003 | Anderson et al. ....... 324/207.17 |

FOREIGN PATENT DOCUMENTS

| EP | 0 427 882   | 5/1991 |
| EP | 0 928 976   | 7/1999 |
| GB | 2 082 097   | 3/1982 |
| JP | 10039040    | 2/1998 |
| WO | WO 03/095154 | 11/2003 |

* cited by examiner

*Primary Examiner*—John Barlow
*Assistant Examiner*—Cindy D. Khuu
(74) *Attorney, Agent, or Firm*—Nixon & Vanderhye P.C.

(57) ABSTRACT

An increased precision position sensor includes a first magnetic field sensing device; a second magnetic field sensing device; and a processor, the processor further includes a calibrator; a mathematical model to predict the magnetic field at a given position relative to the object; and an estimator algorithm to compare the measured magnetic field within the predicted magnetic field, thereby calculating the most likely position of the position sensor relative to the magnetic object. A position sensor in accordance with the invention is capable of locating the axis of a cylindrical magnetic object to within ±0.5 mm through 70 mm thick aluminium, and is expected to find application, in the aerospace industry, or other industries where high precision during manufacture is required. The invention may be conveniently embodied in a portable, handheld device.

10 Claims, 2 Drawing Sheets

INCREASED PRECISION POSITION SENSORS

BACKGROUND OF THE INVENTION

1. Field of the Invention

This application is the U.S. national phase of international application PCT/GB2004/004674, filed in English on 4 Nov. 2004, which designated the U.S. PCT/GB2004/004674 claims priority to GB Application No. 0325989.2 filed 7 Nov. 2003 and EP Application No. 03257035.0 filed 7 Nov. 2003. The entire contents of these applications are incorporated herein by reference.

This invention relates to a system for increasing the precision of a position sensor. In particular, this invention relates to a system for increasing the precision of a position sensing system incorporating magnetic field sensing devices such as Hall Effect devices.

2. Discussion of Prior Art

Position sensors and position sensing systems are often used in manufacturing applications where it is necessary to drill holes 'blind', that is where it is not possible to see the structure through which the hole is to be drilled. One example of such a manufacturing application is found in the aerospace industry when assembling a wing skin and a wing box where it is essential to determine accurately where to drill attachment holes through the wing skin and into the supporting feet of a rib of the wing box. Erroneous drilling of such attachment holes results in the incorrect distribution of stresses and strains through the airframe.

Conventionally, pilot holes are drilled from within the wing box outwards through the rib foot and the wing skin, a process known as back drilling. The pilot holes are then used as a guide for the drilling of attachment holes. However, since space is restricted within the wing box, the back drilling process is complex and prone to errors. Correction of these errors is a further time consuming task, and requires further drilling that may deleteriously effect the robustness of the resulting structure. There is thus a need for a position sensor to locate the correct drilling location for the attachment holes from without the wing box.

A known position sensor comprises an array of Hall Effect devices used to sense the magnetic field due to a cylindrical magnetic object placed at the desired location of the attachment hole. The Hall Effect devices are arranged in concentric circles such that the axis of the cylindrical magnetic object is located when each Hall Effect device in a given circle senses the same magnetic field. Such a position sensor is able from above the wing skin, to locate the axis of a cylindrical magnetic object placed on a rib foot within the wing box to within a tolerance of ±2.5 mm.

WO2004/016380 also describes a method and apparatus for locating non-visible objects. In this known method and apparatus the position of the object can be sensed by means of a suitable array of Hall effect sensors which can be moved relative to the object in question.

However, a greater degree of precision in locating the magnetic object is typically required for such position sensors to be useful in the aerospace industry or other industries where high precision during manufacture is required.

SUMMARY OF THE INVENTION

It is an object of the present invention to improve the precision of such position sensors.

By application of the software of the present invention to known position sensors it is another object of the present invention to address at least one of the above-identified disadvantages associated with the position sensors currently in use.

It is another object of the present invention to allow sensing of the position of a magnetic object through thick stacks of intermediate material (for example, through thick wing skins).

In broad terms, the invention resides in the concept of using a mathematical model to predict the magnetic field associated with the magnetic object, and comparing the predicted magnetic field with the magnetic field measured by the array of Hall Effect devices. The comparison can be effected using an estimator algorithm and allows the location of the magnetic object to be determined to an improved precision.

According to a first aspect of the invention, there is provided a position sensor for sensing the position of an object having an associated magnetic field comprising:

a first magnetic field sensing device at a first position that outputs a first signal related to the magnetic field at the first position;

a second magnetic field sensing device at a second position that outputs a second signal related to the magnetic field at the second position;

a processor to derive from the first signal and the second signal the most likely position of the position sensor relative to the object, wherein the processor comprises:

a first calibrator to calibrate the first magnetic field sensing device, thereby deriving a first measured magnetic field;

a second calibrator to calibrate the second magnetic field sensing device, thereby deriving a second measured magnetic field;

a mathematical model to predict the magnetic field at a given position relative to the object;

an estimator algorithm to compare the magnetic field predicted by the mathematical model with the first measured magnetic field and the second measured magnetic field, thereby calculating the most likely position of the position sensor relative to the object.

Advantageously, the improved precision of a position sensor according to the invention dramatically improves the efficiency of construction tasks in which high precision is required. In particular, the position sensor is able to locate the axis of a cylindrical magnetic object to within ±0.5 mm when the position sensor is separated from the cylindrical magnetic object by a 70 mm thick aluminium stack. Conveniently, such a high level of precision is sufficient for the position sensor to be used in aerospace applications. Use of the position sensor avoids time consuming and complex procedures such as back drilling and is likely to reduce the occurrence of errors during wing construction. Correction of such errors requires further drilling that increases the number of potential weaknesses in the structure. Use of a position sensor according to the invention may thus advantageously increase the useful service life of the wing structure. Furthermore, the amount of waste metal produced is reduced, since a large build up of errors during construction will eventually require wing assembly to be scrapped.

Conveniently, in accordance with an exemplary embodiment of the invention which will be described hereinafter in detail the object can be a cylindrical magnetic object. Advantageously, cylindrical magnetic objects are easily obtained, and their associated magnetic field is easily predicted by known mathematical modeling techniques. Conveniently, in accordance with the exemplary embodiment of the invention, the magnetic field sensing devices may comprise Hall Effect sensing devices. Hall effect sensing devices are preferable because they are well known in the art of magnetic field measurement, easy to obtain in a complete package form, and cheap. Furthermore, there exists a simple relationship between the output voltage of a Hall effect sensing device and the magnetic field at the position of the device, thus simplifying the calibration process.

In the known position sensor described hereinabove, the operator is provided only with the signals from the magnetic field sensing devices. A position sensor according to the invention advantageously derives the most likely position of the position sensor relative to the object. The time taken to locate the correct drill site is thus reduced since the operator is not required to further interpret the data provided by the position sensor.

Preferably, the first calibrator comprises a correction model. Optionally, the correction model comprises a gain term and an offset term, although any arbitrary correction model may be used.

Advantageously, the use of the calibrator improves the accuracy and reliability of the position sensor, by correcting for discrepancies between the mathematical model and the signals from the Hall Effect devices. The calibrator preferably calibrates the Hall Effect devices individually. Furthermore, the calibrator fully determines the parameters of the mathematical model.

Preferably, the estimator algorithm comprises an extended Kalman filter algorithm. Advantageously, since the extended Kalman filter algorithm is a recursive algorithm, the processor is able to continually derive the most likely position of the position sensor relative to the object in real time. Operation of the position sensor is therefore advantageously simplified.

Optionally, during operation of the position sensor the object is separated from the position sensor by a wing skin. Optionally, during operation of the calibrator, the first magnetic field sensing device is at a known position relative to the object and is separated from the object by a wing skin of predetermined thickness.

Preferably, the estimator comprises a software program. Preferably, the calibrator comprises a software program.

When both the estimator and the calibrator are in the form of software programs, the position sensor can conveniently be embodied as a portable hand held device. Such a portable device can be used easily by a single operator to locate drilling sites precisely without the need for additional machinery or equipment. Moreover, since the most likely position of the position sensor relative to the object is continually derived in real time, the operator is able to quickly and easily maneuver the position sensor around the construction area until the correct drill site is found. Such a feature is advantageous for large scale construction tasks, and in particular allows the invention to be conveniently used during the assembly of an aircraft wing.

According to a second aspect of the invention, there is provided a method of sensing the position of an object having an associated magnetic field using a position sensor comprising first and second magnetic field sensing devices at first and second positions the method comprising the steps of:
(a) sensing a first signal related to the magnetic field at the first position from the first magnetic field sensing device;
(b) sensing a second signal related to the magnetic field at the second position from the second magnetic field sensing device;
(c) calibrating the first magnetic field sensing device, thereby deriving a first measured field from the first signal;
(d) calibrating the second magnetic field sensing device, thereby deriving a second measured magnetic field from the second signal;
(e) determining a predicted magnetic field at a given position relative to the object using a mathematical model;
(f) comparing the predicted magnetic field with the first and second measured magnetic fields using an estimator algorithm, thereby calculating the most likely position of the object relative to the position sensor.

It is to be appreciated that the invention also resides in a computer program comprising program code means for performing the steps described herein above when the program is run on a computer and/or other processing means associated with the position sensor. Furthermore the invention also resides in a computer program product comprising program code means stored on a computer readable medium for performing the steps described herein above when the program is on a computer and/or other processing means associated with the position sensor.

BRIEF DESCRIPTION OF THE DRAWINGS

The invention will now be described by way of example only with reference to the accompanying drawings in which.

DETAILED DISCUSSION OF EMBODIMENTS

Figure 1:
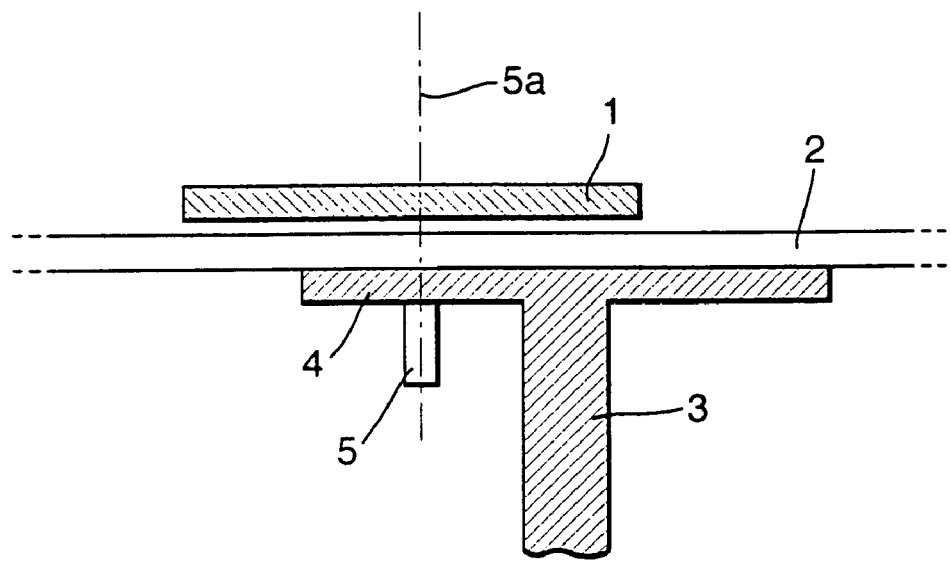
FIG. 1 illustrates a Hall Effect sensor device as used to sense the position of a cylindrical magnetic object.

FIG. 1 shows a Hall Effect sensor device 1 positioned above a wing skin 2. The wing skin 2 is to be fastened to supporting structures including a rib 3. A bolt may be used to attach the wing skin 2 to a rib foot 4. The object of the invention is to locate precisely the desired position of the bolt such that a bolt hole may be drilled. A cylindrical magnetic object 5 is placed on the rib foot 4 such that the central axis 5a of the cylindrical magnetic object 5 coincides with the central axis of the desired bolt hole.

Figure 2:
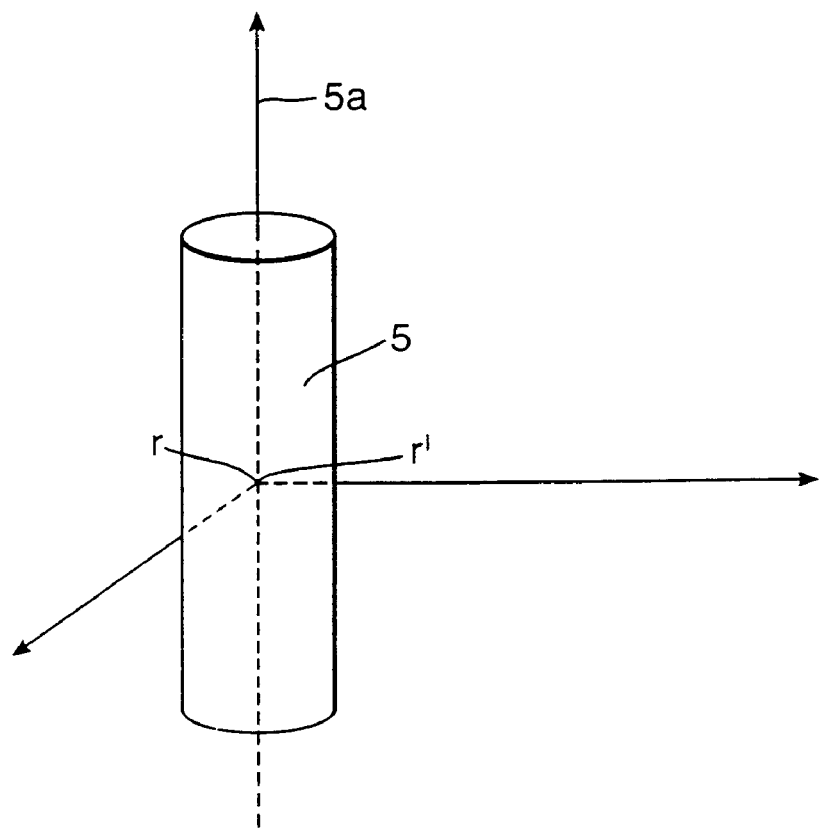
FIG. 2 illustrates the geometry of a model used to calculate the magnetic field due to the cylindrical magnetic object of FIG. 1.

FIG. 2 illustrates the geometry of a model used to predict the magnetic field B due to the cylindrical magnetic object 5. The magnetic field B is radially symmetric about the central axis 5a of the cylindrical magnetic object 5. The magnetic field B at position r and can be modeled using the equation $$B \propto \frac{M_o}{4\pi} \int \frac{M(r') \times (r-r')}{|r-r'|^3} dV' \qquad (1)$$

where $M_o$ is a constant, $M(r')$ is the magnetic dipole moment of a point dipole at position r and V' is the volume of the cylindrical magnetic object 5. The principle of the formula (1) is to treat the cylindrical magnetic object 5 as a volume of point magnetic dipoles. The field at r is then the sum of the contributions from each dipole in the volume V'.

Figure 3:
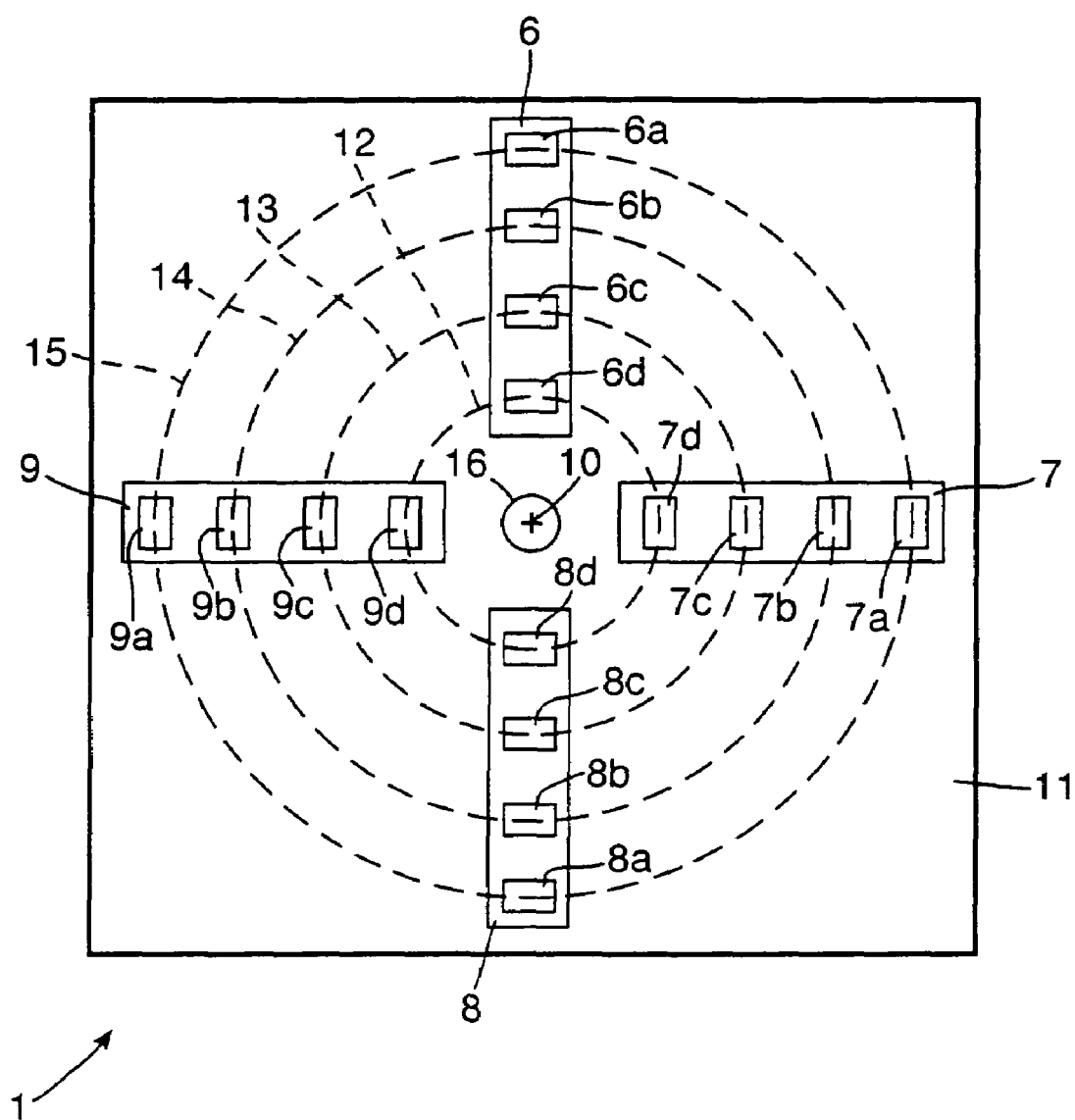
FIG. 3 illustrates the Hall Effect sensor device of FIG. 1 in plan view.

FIG. 3 shows the Hall Effect sensor device 1 in plan view. The Hall Effect sensor device 1 comprises sixteen Hall Effect sensors 6(*a–d*) to 9(*a–d*) that are arranged in concentric circles 12–15 as indicated by the dashed lines. A target 10 indicated by a cross is located at the center of circles 12–15. The Hall Effect sensors 6(*a–d*) to 9(*a–d*) are mounted on four sensor blocks 6, 7, 8 and 9. Blocks 6, 7, 8 and 9 are arranged so as to form a cross-shape. The center of the cross-shape coincides with the target 10 at the center of circles 12–15. The sensor blocks 6, 7, 8 and 9 are embedded in a potting material 11. There is a hole 16 in the potting material 11 at the position of the target 10. The hole 16 is fabricated so as to be suitable for a guide drill hole to be made in the wing skin 2 without moving the sensor device 1 when the target 10 is positioned directly above the central axis of the cylindrical magnetic object 5.

The Hall Effect sensors 6(*a–d*) to 9(*a–d*) each output a voltage that is linearly related to the component of magnetic field perpendicular to the plane of the cross-shape formed by the sensor blocks 6, 7, 8 and 9. This component of magnetic field can be correlated with the sensor output voltages d using $$p = Xd + Z \qquad (2)$$

where p is the theoretical field predicted by equation (1), and X and Z are constant for a given magnetic object. Thus for each Hall sensor 6(*a–d*) to 9(*a–d*) there is a gain X and offset +Z.

An extended Kalman filter algorithm is used to calculate the most likely position of the target 10 relative to the central axis of the cylindrical magnetic object 5. The extended Kalman filter is a well-known nearly optimal stochastic recursive estimator applicable to non-linear systems. Any fitting algorithm suitable for non-linear systems could also be used. In this embodiment of the invention, the extended Kalman filter algorithm may be operated in both a calibration mode and a positioning mode. In calibration mode, the sensor is placed with the target 10 on the axis 5*a* of the cylindrical magnetic object 5 with a known skin thickness between the center of the magnetic object 5 and the target 10. The extended Kalman filter algorithm is then used to calculate the calibration parameters for each Hall sensor whilst the variable (x, y, t) that describes the position of the target 10 is held fixed. The calibration mode also determines unknown constants in equation (1). In the positioning mode, the calibration parameters are fixed whilst the position (x, y, t) is calculated using the Kalman filter algorithm. The Hall Effect sensor device 1 may then be moved to a new position and the calculation repeated. These steps are repeated until the target is located on the axis 5*a* of the cylindrical magnetic object 5.

In an alternative embodiment of the invention, a separate calibration algorithm is used. The output voltages from the Hall effect sensors are measured with the sensor at a number of known positions relative to the cylindrical magnetic object 5, and with a number of known skin thicknesses between the cylindrical magnetic object 5 and the sensor. The calibration program then calculates optimal values for the calibration parameters and unknown constants in equation (1) using all the data thus collected. The extended Kalman filter algorithm is then used as described above to calculate the position of the sensor relative to the cylindrical magnetic object.

The invention allows the axis of the cylindrical magnetic object to be located to a precision of ±0.5 mm when the wing skin 2 is 70 mm thick aluminium. This may be compared to a precision of ±2.5 mm obtained using a previous Hall Effect position sensing device in which the central axis of a cylindrical magnetic object was located using only the condition that the output voltage of the Hall sensors in a given circle 12–15 be equal. A precision of ±2.5 mm is not sufficient for aerospace applications. The precision of the invention is sufficient for aerospace applications.

Other possible embodiments of the invention will be obvious to the skilled reader. It is not necessary to use a cylindrical magnetic object. Equation (1) is equally applicable to a magnetic object of any shape. Comparison of the prediction of equation (1) with the measured signals from the magnetic field sensing devices can then be performed as described above to effect position sensing. For example, a bar magnet may be used to sense position in one direction only, and the invention may be simply modified to sense rotary position precisely. Any pattern of magnetic field sensing devices may also be used. In order for the operator to locate the axis of a cylindrical magnetic object, a minimum of two magnetic field sensing devices are required. In preferred embodiments of the invention, however, more than two magnetic field sensing devices are present. The exact number of magnetic field sensing devices used may vary. It will also be clear to the skilled reader that the invention is applicable in many industrial fields other than the aerospace industry.

It is thus to be appreciated that the present invention can be used in a variety of applications where it is required to provide position sensing through an intermediate (non-ferrous) material, for example aircraft wing skins. The skilled person in the relevant art would however recognise that it is possible to conceive of a number of applications other than that for which the inventive system was originally developed, which will involve the blind positioning and assembly of components. This could include other applications in the aerospace, automotive and similar manufacturing industries. The invention could also be amenable to deployment in robotic systems, if desired.

The invention claimed is:

1. A method of determining a drilling location on a wing skin, such that an attachment hole can be drilled through the wing skin and a supporting structure, the method comprising the steps of:
   (a) placing an object having an associated magnetic field on the supporting structure at the drilling location;
   (b) locating a position sensor on the wing skin, the position sensor comprising first and second magnetic field sensing devices, said first magnetic field sensing device located at a first position and the second magnetic field sensing device located at a second position, said second position different from said first position;
   (c) calibrating the first magnetic field sensing device, thereby deriving a first calibration;
   (d) calibrating the second magnetic field sensing device, thereby deriving a second calibration;
   (e) predicting the associated magnetic field using a mathematical model to obtain a predicted magnetic field;
   (f) sensing a first signal related to the magnetic field at the first position from the first magnetic field sensing device, and using the first calibration to derive a first measured magnetic field from the first signal;
   (g) sensing a second signal related to the magnetic field at the second position from the second magnetic field sensing device, and using the second calibration to derive a second measured magnetic field from the second signal;

(h) comparing the predicted magnetic field with the first and second measured magnetic fields using an estimator algorithm, thereby calculating a most likely position of the object relative to the position sensor;

(i) maneuvering the position sensor on the wing skin towards the calculated most likely position;

(j) repeating steps (f) to (i) above, until the drilling location is determined; and (k) drilling said attachment hole at said drilling location.

2. A method as claimed in claim 1 wherein the step of calibrating the first magnetic field sensing device comprises using a correction model.

3. A method as claimed in claim 1 wherein the correction model comprises a gain term and an offset term.

4. A method as claimed in claim 1 wherein the estimator algorithm comprises an extended Kalman filter algorithm.

5. A method as claimed in claim 1 further comprising the step of continually deriving the most likely position of the position sensor relative to the object in real time.

6. The method according to claim 1, wherein the step of calibrating the first magnetic field sensing device comprises the step of placing the position sensor at a known position relative to the object, in said known position the position sensor is separated from the object by a wing skin of predetermined thickness.

7. The method according to claim 1, wherein the object comprises a cylindrical magnetic object.

8. The method according to claim 1, wherein the magnetic field sensing devices comprise Hall effect sensing devices.

9. A portable device for performing the method of claim 1.

10. A computer program product comprising a readable storage medium containing computer readable instructions for controlling a computer to perform steps (c) through (h) of the method of claim 1.

* * * * *